United States Patent [19]
Kajioka

[11] Patent Number: 5,239,362
[45] Date of Patent: Aug. 24, 1993

[54] FIBER-OPTIC ROTATION SENSOR
[75] Inventor: Hiroshi Kajioka, Hitachi, Japan
[73] Assignee: Hitachi Cable Limited, Tokyo, Japan
[21] Appl. No.: 454,224
[22] Filed: Dec. 21, 1989
[30] Foreign Application Priority Data
  Dec. 27, 1988 [JP] Japan .................. 63-327923
[51] Int. Cl.$^5$ .................. G01C 19/72
[52] U.S. Cl. .................. 356/350; 385/39; 385/122
[58] Field of Search .................. 356/350; 385/122, 39, 385/41, 42

[56] References Cited
U.S. PATENT DOCUMENTS

| 4,688,882 | 8/1987 | Failes | 385/39 |
| 4,856,900 | 8/1989 | Ivancevic | 356/350 |
| 4,881,817 | 11/1989 | Kim et al. | 356/350 |
| 4,962,987 | 10/1990 | Doran | 385/122 |

Primary Examiner—Samuel A. Turner
Assistant Examiner—LaCharles P. Keesee
Attorney, Agent, or Firm—Dykema Gossett

[57] ABSTRACT

The fiber-optic rotation sensor comprises a sensing loop using an optical fiber which essentially performs a single polarization when bent, both end portions of the sensing loop being disposed with the principal axes of polarization thereof orthogonal to each other and the end portions being joined by an evanescent wave coupling to form a ring interferometer, a device for introducing to an input end of the interferometer a linearly polarized light at a bearing of 45° relative to the principal axis of polarization of the interferometer, and a retardation measuring system provided at an output end of the interferometer for picking up an electrical output proportional to a rotational angular velocity applied to the interferometer. When the linearly-polarized light is introduced to the input end of the coupling portion of the ring interferometer at a bearing of 45° with respect to the principal axis of polarization of the interferometer, the light is branched into two polarized light beams running through the sensing loop, one clockwise and the other counterclockwise. The polarized light beams are recombined with each other to be input to the retardation measuring system from which an electrical output proportional to the rotational angular velocity applied to the interferometer is picked up.

23 Claims, 3 Drawing Sheets

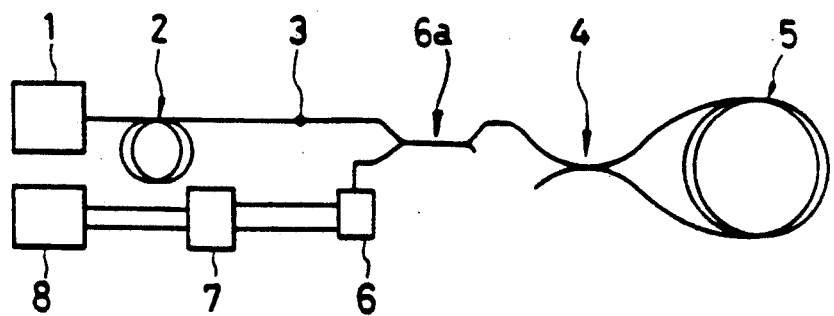
FIG.1
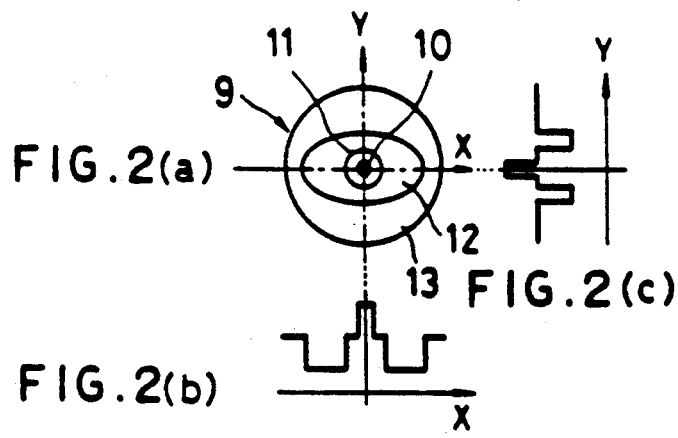
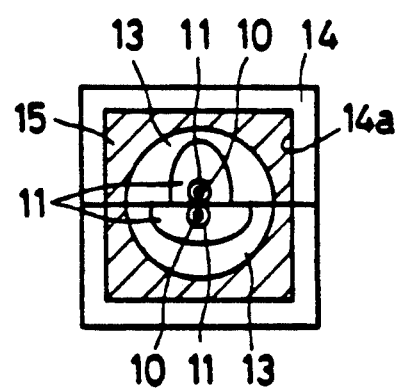
FIG.3

FIG. 6(a) PHASE MODULATION 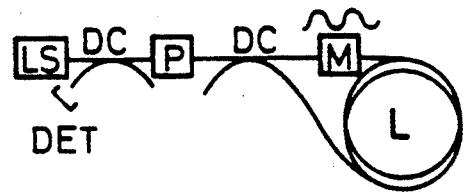
FIG. 6(b) SERRODYNE 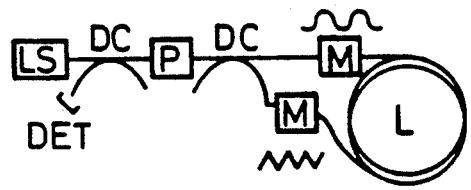
FIG. 6(c) RING RESONANCE 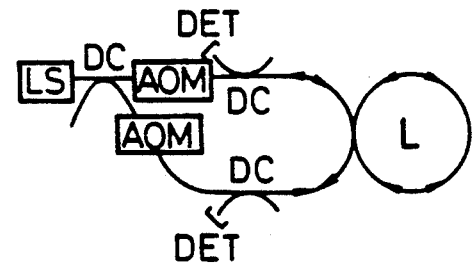
FIG. 6(d) FREQUENCY MODULATION 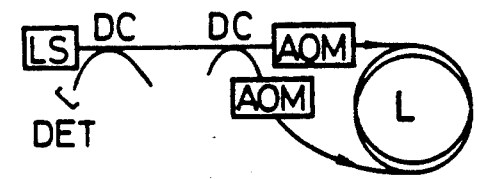
FIG. 6(e) HETERODYNE 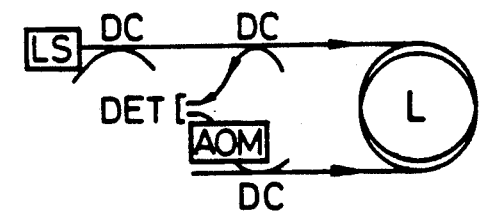
FIG. 6(f) ORTHOGONAL POLARIZATION 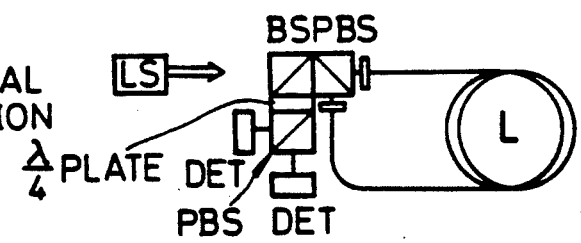
FIG. 6

FIBER-OPTIC ROTATION SENSOR

BACKGROUND OF THE INVENTION

1. Technical Field

The present invention relates to a fiber optic rotation sensor and more particularly to a fiber optic rotation sensor which can be made inexpensively.

2. Background Art

Fiber optic rotation sensor, or so-called optical fiber gyroscopes (OFG) are expected to be used as the next generation rotation sensors. A variety of systems are known which employ fiber optic rotation sensors, as shown in FIGS. 6(a) to 6(f) of the accompanying drawings.

In FIGS. 6(a) to 6(f), LS denotes a light source, P a polarizer, DC a directional coupler, M a phase modulator, AOM a frequency shifter (acousto-optic modulator), L an optical fiber loop and DET a detector.

A first, phase modulation-type system is shown in FIG. 6(a) in which the timing for phase modulation of the light propagated clockwise through the fibber loop is deviated, by the propagation delay time, from that of the light propagated counterclockwise through the loop. The deviation is utilized to provide equivalently a phase difference of $\pi/2$. The merits of such a system are good resolution and zero-point stability as well as simplicity in its optics system. However, due to measurement of analog quantities, there are problems as to dynamic range and scale factor stability.

A second, serrodyne-type system is shown in FIG. 6(b). The cycle frequency of a sawtooth wave is controlled, and the phase difference due to the Sagnac effect is electrically corrected. This system possesses good resolution, zero-point stability, dynamic range and scale factor stability, which makes it suitable for digital processing. A disadvantage is that a high-speed optical phase modulator and strict control of the phase modulation conditions thereof are required.

A third, ring resonance-type system is shown in FIG. 6(c). The Sagnac effect is detected as a difference in resonance frequency between the light propagated clockwise through the fiber loop and the light propagated counterclockwise through the loop. The system is advantageous in that a short optical fiber may be used, and it exhibits good resolution, zero-point stability, dynamic range and scale factor stability. Also, it is suitable for digital processing. However, a laser with a narrowed spectrum of about 100 KHz is required.

A fourth, frequency modulation-type system is shown in FIG. 6(d). An optical frequency shifter AOM is inserted between the light propagated clockwise through the fiber loop and the light propagated counterclockwise through the loop, and is adjusted to provide a frequency shift for canceling out the phase difference due to the Sagnac effect. This system possesses good dynamic range and scale factor stability and is suitable for digital processing. The asymmetric property of the optical frequency shifter AOM, however, produces a bias, leading to poor stability of zero point.

A fifth, heterodyne-type system is shown in FIG. 6(e). The fact that the phase of a beat frequency component of the output from the detector is equivalent to the phase difference due to the Sagnac effect is used in this system. The system exhibits wide dynamic range and is suitable for digital processing. On the negative side, the light propagated respectively clockwise and counterclockwise through the fiber loop is separated, and the sound velocity in the optical frequency shifter AOM is dependent on temperature, resulting in poor stability of zero point.

A sixth, system of a single polarization (SP) fiber cross-polarization type is shown in FIG. 6(f). Two polarizing beam splitters PBS are used, one in front of a beam splitter BS and the other at the back of the BS, and the light from the light source LS is extracted through cross-polarization. The light beams propagated clockwise and counterclockwise respectively through the single polarization optical fiber loop L are detected by the detectors DET through the analyzer to measure the rotational angular velocity of the device. In this case, a 90° phase bias is applied by a quarter-wave plate ($\lambda/4$ plate) in order to optimize the detection sensitivity. This system uses simple signal processing because of the absence of modulators.

The first five systems discussed above are each based on the use of a modulator; however, each have drawbacks in terms of size and cost. In addition, the fiber-optic rotation sensors of these systems each have both an optic system and an electric system present in a sensor portion thereof, causing problems when the rotation sensor is applied to telemetering or to sensing in those applications which are easily affected by electromagnetic induction. Moreover, these systems each require a lock-in amplifier (synchronous detection circuit) as a signal-processing circuit for the fiber-optic rotation sensor, Therefore, the rotation sensors based on these systems are generally large in size and are expensive.

The SP fiber cross-polarization system mentioned above, on the other hand, does not use a phase modulator but extracts the light beams propagated respectively clockwise and counterclockwise through the fiber loop by cross-polarization and does not require any lock-in amplifier in the signal detection portion thereof. Therefore, the SP system permits the use of a simpler processing circuit, as compared with the above-mentioned phase modulation systems.

The SP system does, however, possess drawbacks on a structural basis. First the polarizing beam splitter PBS is generally several millimeters square in size, due to the structure thereof. Thus, when the beam splitter is used in a fiber optic measuring system, it is necessary to collimate the light beam emitted from the optical fiber, to lead the collimated beam to the polarizing beam splitter and again to couple the split outputs from the beam splitter to the optical fiber through a lens. This requirement renders the optical fiber coupling portion expensive and large in size. Second, the SP system includes a spatial propagation portion in the coupling at the ends of the optical fiber loop. This structure causes the optical path length to vary with temperature and causes a zero-point offset problem. Therefore, it is impossible to construct the optical measuring system entirely as a single fiber-optic system.

SUMMARY OF THE INVENTION

One object of the present invention is to provide a novel rotation sensor which does not suffer from the above-mentioned shortcomings and which ensures marked improvements in zero-point drift, cost and size and which is constructed totally as a single fiber-optic system.

According to one aspect of the present invention, there is provided a fiber-optic rotation sensor comprising a sensing loop using an optical fiber which effectively performs a single polarization when bent, both end portions of the sensing loop being disposed to have principal axes of polarization thereof orthogonal to each other and the end portions being joined by an evanescent wave coupling to form a ring interferometer, means for introducing to an input end of the interferometer a linearly polarized light at a bearing of 45° relative to the principal axis of polarization of the interferometer, and a retardation measuring system provided at an output end of the interferometer for picking up an electrical output proportional to a rotational angular velocity applied to the interferometer.

The above sensor operates as follows. The sensing loop comprises the optical fiber which can effectively undergo a single polarization when bent, and both ends of the sensing loop themselves are joined to each other as the evanescent wave coupling portion. The joint is made by disposing the two ends of the loop such that the principal axes of polarization are orthogonal to each other. Therefore, when the linearly polarized light is introduced to the input end of the coupling portion of the ring interferometer at a bearing of 45° with respect to the principal axis of polarization of the interferometer, the light is branched into two polarized light beams, one propagating clockwise and one propagating counterclockwise through the sensing loop. The polarized light beams running through the loop are recombined with each other, to be input to the retardation measuring system, from which an electrical output proportional to the rotational angular velocity applied to the interferometer is picked up.

The rotation sensor possesses the following advantages:

(1) The polarizing beam splitter portions of the crossed-single-polarization-fiber polarization system are each formed by using an optical fiber coupler capable of performing an absolute single polarization, thereby constructing the rotation sensor entirely as one fiber-optic system;

(2) There is no splice between the evanescent wave coupling portion and the sensing loop. Thus, a small and inexpensive rotation sensor device is provided. With the rotation sensor constructed entirely as one fiber-optic system, drifts are markedly reduced;

(3) The absence of optical modulators eliminates the necessity for supplying a modulating electrical signal to the optic system so that the sensor device is free from influence of electromagnetic induction. Also, the absence of optical modulators ensures smaller size and lower cost;

(4) The system for processing electrical signals can be simplified, which leads to smaller size and lower cost; and, (5) It is further possible to improve the control system for moving objects used in other fields by employing such an inexpensive sensor.

BRIEF DESCRIPTION OF THE DRAWINGS

FIG. 1 is a block diagram showing an embodiment of a fiber-optic rotation sensor according to the present invention;

FIG. 2 is a set of views illustrating a cross-sectional configuration (a) and refractive index distributions (b) and (c) of a single polarization optical fiber used in the embodiment of the present invention;

FIG. 3 is a cross-section of an optical directional coupling used in the embodiment of the present invention;

FIGS. 6(a-f) are block diagrams schematically showing fiber-optic rotation sensors according to the prior art.

DESCRIPTION OF THE PREFERRED EMBODIMENTS

Figure 4:
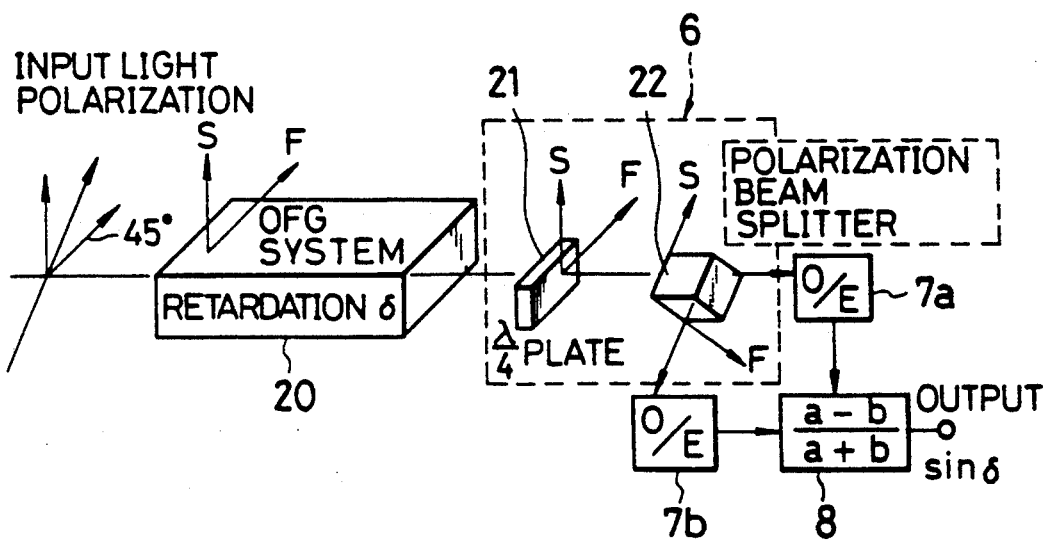
FIG. 4 is a block diagram showing an example of a retardation measuring system in the fiber-optic rotation sensor of the present invention.

The present invention will now be explained based on one embodiment thereof shown in the accompanying drawings.

FIG. 1 illustrates a structure of a rotation sensor constructed totally as a fiber-optic system. In the figure, there are shown a light source 1, an optical fiber-type polarizer 2, a splice point 3, an optical directional coupler 4, a sensing loop 5, an optical system for a retardation measuring system 6, a detector (light-receiving device) 7 and an electrical output calibrator 8. The optical system 6 and the detector 7 form a retardation measuring system.

As an optical fiber for the sensing loop 5, the optical directional coupler 4 and the pigtail of the light source 1, a birefringence optical fiber having a bending loss in a cross-polarization mode, was used. The cross-sectional structure and refractive index distributions of the optical fiber 9 are respectively shown in FIGS. 2(a), 2(b) and 2(c). The optical fiber 9 is an elliptic jacket-type polarization-maintaining optical fiber having a core 10, a cladding 11, an elliptical jacket 12 and a support 13. The refractive index with radial distances X and Y from the center of the optical fiber are shown in FIGS. 2(b) and 2(c) respectively. The index distributions are so designed that the Y polarization shows a greater bending loss, and the X polarization shows a smaller bending loss. The optical fiber 9 was designed so that the jacket portion 12 thereof is depressed in refractive index profile, with a small normalized frequency V of about 1.6. The single polarization (SP) optical fiber 9, due to a bending loss difference in the cross-polarized mode therefore, effectively performs an absolute single-polarization (ASP) when a proper bending is applied thereto.

The rotation sensor was produced as follows. First, a 150-meter-long optical fiber was wound around a 50 mm diameter bobbin to form an optical fiber coil as the sensing loop 5. The plastic coating of the fiber coil was peeled at both ends thereof by 3 to 4 mm. Next, as shown in FIG. 3, the two ends of the optical fiber were disposed opposite to each other, with their principal axes of polarization being orthogonal to each other, in a couple of silica substrates 14, each provided with a groove 14a for accommodating the optical fiber. The remaining spaces of the grooves 14a were filled with epoxy resin 15 to fix the optical fiber. Thereafter, the two quartz substrates 14 were each ground to the vicinity of the core 10 and then joined to each other, followed by an adjustment to obtain a splitting ratio of 50% by utilizing evanescent wave coupling.

The splitting ratio adjustment was carried out as follows. The light source 1 was a superluminescent diode SLD, with the polarizer 2 being attached thereto as a pigtail. The polarizer 2 was wound around the bobbin, which was about 60 mm in finished outside diameter, as the sensing loop 5. The polarizer 2 and the sensing loop 5 were connected to each other at the splice portion 3, with a 45° shift between their principal axes of polarization. In this case, the condition where the optical power output at the other output end of the optical directional coupler 4 is minimized corresponds to the splitting ratio of 50%; therefore, the two quartz substrates 14 were adjusted to satisfy such a condition. Then, the mating surfaces of the substrates 14 were fixed by $CO_2$ laser to produce the directional coupler 4.

In summary, two SP optical fibers 9 were joined to each other by the evanescent wave coupling with their principal axes of polarization orthogonal to each other to provide the ground-type optical directional coupler 4. The coupler 4 was connected to the sensing loop as a coupling without any splice to form a ring interferometer. The polarizer 2 was connected to the ring interferometer to obtain an integral unit. Meanwhile, the other input end of the optical directional coupler 4 is left disconnected.

The optical directional coupler operates as follows. The SP optical fiber only allows light to propagate in the major axis (slow axis) mode. Therefore, when a linearly polarized light at a bearing of 45° is incident on one input terminal of the directional coupler 4, the light is branched at two output terminals of the coupler 4. When a light beam in the slow axis mode is incident on the input terminal of the coupler 4, the beam is emitted from one of the output terminals. When a light beam in the fast axis mode is incident on the input terminal, the light beam is emitted from the other output terminal of the coupler 4. Similarly, only a light beam in the slow axis mode is input through one of the output terminals, and a light beam in the slow axis mode and a light beam in the fast axis mode are separately emitted respectively from two input terminals. Thus, the directional coupler 4 has the function of separating polarized waves.

The optical directional coupler 4 has two input ends. At one of these input ends, to which the 45° linearly-polarized beam is introduced, there is provided another optical directional coupler 6a. The 45° linearly-polarized beam is guided to the input end of the ring interferometer via this second optical directional coupler 6a.

The second optical directional coupler 6a is, like the first coupler 4, a ground-type coupler made from optical fibers. However, the second directional coupler 6a is different from the first directional coupler 4 in structure. Specifically, the former 6a is made as follows: two optical fibers are disposed opposite to each other with their principal axis of polarization being parallel to each other (not orthogonal to each other).

The optical fiber may also be drawn from the bobbin, around which the polarizer 2 has been wound, with the splice portion 3 being a mark, and then the second optical directional coupler 6a may be formed using this drawn optical fiber and another optical fiber.

In the above optic system, the two light beams separated by the optical directional coupler 4 and propagated respectively clockwise and counterclockwise through the sensing loop 5 are recombined into the cross-polarized mode at the output end of the ring interferometer, i.e., at that terminal of the optical directional coupler 4 which the 45° linearly-polarized beam is incident upon. The linearly-polarized beam returning to the light source 1, after recombination, is split by the second optical directional coupler 6a and is led to the optic system 6 of the retardation-measuring system.

A detailed block diagram of the optic system for retardation measuring will now be discussed with reference to FIG. 4. A box 20 labeled "RETARDATION δ" in FIG. 4 represents the sensing loop 5. The optic system 6 for retardation measuring of FIG. 1 is enclosed by a broken line in FIG. 4. The second optical directional coupler 6a, which functions as a light-splitting means, is not shown in FIG. 4.

When the quarter-wave plate 21 and the polarizing beam splitter 2 are disposed in 45° angular relation to each other, as shown, the light beams propagating respectively clockwise and counterclockwise through the sensing loop in the rotation sensor are detected in a cross-polarized state, whereby the phase difference due to the Sagnac effect is detected as a retardation. Two outputs Pa and Pb in the cross-polarized mode picked up at the polarizing beam splitter 22 are converted by respective detectors 7a and 7b into electrical signals, which are subjected to calculation of $(Pa-Pb)/(Pa+Pb)$ by the electrical output calibrator 8, to yield an output signal representing angular velocity proportional to sin δ. The calibrating portion 8 incorporates a circuit for automatic gain adjustment so as to output a predetermined voltage per degree/second.

Here, it is to be understood that the structural form of the rotation sensor according to the present invention is not limited to the above embodiment.

Figure 5:
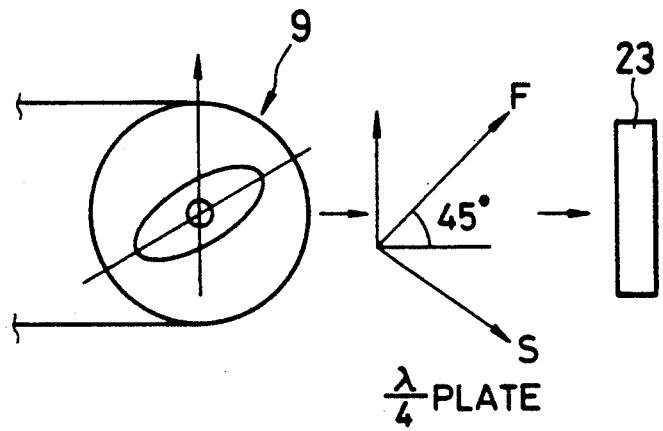
FIG. 5 is a schematic view illustrating another example of the retardation measuring system according to the present invention.

For instance, the retardation may be measured by a method using a detector 23 illustrated in FIG. 5 in place of the polarizing beam splitter, i.e., the Senarmon method. In the Senarmon method, the phase difference δ due to the Sagnac effect can be detected as ½ δ rotation of the linearly-polarized light outgoing from a quarter-wave plate, and, accordingly, it is possible to use the detector 23 for the detection.

In addition, the optic system 6 for retardation measurement shown in FIG. 4 may be replaced by a detection system based on the null method in which the polarizer 23 of FIG. 5 is rotated to obtain an output of "0" constantly.

Moreover, where the phase difference due to the Sagnac effect is $\theta = a^* \Omega$ (where a is a scale factor, and $\Omega$ is an input rotational angular velocity), the output from the fiber-optic rotation sensor is proportional to sin θ. If θ is sufficiently small, $\sin \theta \approx \theta$, it is unnecessary to carry out trigonometric calculations. In the case where the approximation ($\sin \theta \approx \theta$) is not applicable, the rotation sensor may incorporate a central processor unit (CPU) with a function table for conversion from sin θ to θ.

Furthermore, the polarization optical fiber in the above embodiment may be a stressed type or a noncircular core type. Also, the optical directional coupler 4 may be a fused and drawn type.

I claim:

1. A fiber optic rotation sensor, comprising:
   a sensing loop having end portions and including an optical fiber providing a single polarization when bent, both end portions of the sensing loop being disposed with the principal axes of polarization thereof orthogonal to each other and wherein the end portions are joined by an evanescent wave coupling to form a ring interferometer, the interferometer having an input end and an output end;
   means for introducing to the input end of the interferometer linearly polarized light at a bearing of 45° relative to the principal axis of polarization of the interferometer;
   a retardation measuring system provided at the output end of the interferometer for picking up an electrical output proportional to a rotational angular velocity applied to the interferometer; and, two single polarization optical fibers joined to each other by evanescent wave coupling with principal axes of polarization of the optical fibers being orthogonal to each other so as to form an optical directional coupler, said ring interferometer including the optical directional coupler as a coupler, and the sensing loop being connected to the optical directional coupler without a splice.

2. The fiber-optic rotation sensor of claim 1, wherein said light-introducing means includes a laser beam source and a polarizer connecting the laser beam source with the ring interferometer, the polarizer being defined by a wound optical fiber, and the optical fiber of the polarizer is connected by a splice to the optical fiber of the ring interferometer with a 45° shift in the principal axes of polarization at the splice.

3. The fiber-optic rotation sensor of claim 2, wherein said laser beam source includes a superluminescent diode.

4. The fiber-optic rotation sensor of claim 1, wherein the sensing loop includes a coil of optical fiber which is made by winding an optical fiber around a bobbin, the polarizer is wound over the coil of optical fiber around the bobbin, and the ring interferometer and the polarizer connected to the ring interferometer are formed of a single element.

5. The fiber-optic rotation sensor of claim 1, wherein the retardation measuring system includes:
an optical system for changing two light beams respectively running clockwise and counterclockwise through the sensing loop of the ring interferometer into two polarization mode components orthogonal to each other so as to detect a phase difference due to Sagnac effect as retardation; and
detectors for converting two outputs of orthogonal polarization mode components of said optical system into electrical signals respectively.

6. The fiber-optic rotation sensor of claim 5, wherein the optical system for the retardation measuring system includes a quarter-wave plate and a polarizing beam splitter disposed behind the quarter-wave plate, and the quarter-wave plate and the polarizing beam splitter are disposed in a manner such that the polarization axes thereof are shifted by 45° relative to each other, so as to divide the light running through the loop of the ring interferometer respectively clockwise and counterclockwise into orthogonal polarization components and to detect the components.

7. The fiber-optic rotation sensor of claim 5, wherein the retardation measuring system includes a polarizer disposed behind the quarter-wave plate, and the quarter-wave plate and the polarizer are disposed in a manner such that the polarization axes thereof are shifted by 45° relative to each other, so as to divide the light running through the loop of the ring respectively clockwise and counterclockwise into orthogonal polarization components and to detect the components, and the phase difference $\delta$ due to Sagnac effect is detected as a $\frac{1}{2} \delta$ rotation of linearly polarized light outgoing from the quarter-wave plate using the Senarmon method.

8. The fiber-optic rotation sensor of claim 6, wherein the retardation measuring system employs a polarizer disposed behind the quarter-wave plate, and the polarizer is rotated in a manner such that it always outputs "0".

9. The fiber-optic rotation sensor of claim 1, wherein the optical fiber is an oval-jacket polarization-maintaining optical fiber including a core, a cladding, an elliptical jacket and a support.

10. The fiber-optic rotation sensor of claim 9, wherein the jacket of the oval-jacket polarization-maintaining optical fiber has a depressed profile in refractive index and a normalized frequency is 1.6.

11. The fiber-optic rotation sensor of claim 1, wherein the polarization-maintaining optical fiber is a stress-added polarization-maintaining optical fiber.

12. The fiber-optic rotation sensor of claim 1, wherein the polarization-maintaining optical fiber has a non-circular core.

13. The fiber-optic rotation sensor of claim 1, wherein the optical directional coupler is a ground-type coupler.

14. The fiber-optic rotation sensor of claim 1, wherein the optical directional coupler is a fused, drawn type.

15. A method of fabricating a ground-type optical directional coupler, comprising the steps of:
(A) making a coil of optical fiber by winding optical fiber around a bobbin;
(B) peeling a coating of the optical fiber at both ends thereof by a predetermined amount;
(C) placing the peeled ends in a couple of grooves respectively made in a couple of silica substrates in a manner such that the principal axes of polarization thereof are orthogonal to each other;
(D) filling the remaining space of the grooves with resin to fix the ends of the optical fiber;
(E) grinding said couple of silica substrates to the vicinity of the core of the fiber;
(F) joining the silica substrates; and
(G) performing an adjustment to obtain a splitting ratio of 50%.

16. The method of claim 15, further including the step of fixing mating surfaces of the ground silica substrates by $CO_2$ laser after step (G).

17. A fiber-optic rotation sensor, comprising:
a sensing loop using an optical fiber for essentially performing a single polarization when bent, the sensing loop having end portions disposed with the principal axes of polarization thereof orthogonal to each other and the end portions being joined by an evanescent wave coupling to form a ring interferometer;
a polarizer for introducing to an input end of the interferometer light from a laser beam source in the form of a linearly polarized light at a bearing of 45° relative to the principal axis of polarization of the interferometer;
a retardation measuring system provided at an output end of the interferometer for picking up an electrical output proportional to a rotational angular velocity applied to the interferometer;
an electrical output calibration means for processing an electrical signal from the retardation measuring system; and,
two single polarization optical fibers joined to each other by evanescent wave coupling with principal axes of polarization of the optical fibers being orthogonal to each other so as to form an optical directional coupler, said ring interferometer including the optical directional coupler as a coupler and the sensing loop being connected to the optical directional coupler without a splice.

18. The fiber-optic rotation sensor of claim 17, wherein the retardation measuring system includes:
an optical system for dividing the light running respectively clockwise and counterclockwise through the sensing loop of the ring interferometer into two orthogonal polarization mode components so as to detect a phase difference due to Sagnac effect as retardation;

detectors for converting two outputs of orthogonal polarization mode components of said optical system into electrical signals respectively; and electrical output calibration means for receiving two outputs (Pa and Pb) of orthogonal polarization mode in the form of electrical signals from two detectors of the retardation measuring system and for calculating (Pa−Pb)/(Pa+Pb) to convert the outputs into signals representing angular velocity proportional to sin $\delta$ ($\delta$: retardation).

19. The fiber-optic rotation sensor of claim 18, wherein the electrical output calibration means performs a calculation using an approximation of sin $\theta \approx \theta$ when $\theta$ is small enough, where the phase difference due to Sagnac effect $\theta = a^{*}\Omega$ (a: scale factor, $\Omega$: input rotational angular velocity), instead of using a relation that the output of the ring interferometer is proportional to sin $\theta$.

20. The fiber-optic rotation sensor of claim 18, wherein the electrical output calibration means includes a central processing unit for outputting $\theta$ from a pre-established function table of sin $\theta$ and $\theta$ upon receiving the detected sin $\theta$, where an approximation of sin $\theta \approx \theta$ is not applicable.

21. The fiber-optic rotation sensor of claim 18, wherein the electrical output calibration means includes a circuit for automatically adjusting gain so as to output a predetermined voltage per degree/second.

22. The fiber-optic rotation sensor of claim 19, wherein the electrical output calibration means includes a circuit for automatically adjusting gain so as to output a predetermined voltage per degree/second.

23. The fiber-optic rotation sensor of claim 20, wherein the electrical output calibration means includes a circuit for automatically adjusting gain so as to output a predetermined voltage per degree/second.

* * * * *